(12) United States Patent
Reiff et al.

(10) Patent No.: US 8,197,568 B2
(45) Date of Patent: Jun. 12, 2012

(54) FILTER ELEMENT FOR EXTRACTOR HOOD

(75) Inventors: Udo Reiff, Knittlingen (DE); Volkmar Uebele, Bad Nauheim (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 457 days.

(21) Appl. No.: 12/223,347

(22) PCT Filed: Jan. 9, 2007

(86) PCT No.: PCT/EP2007/050172
§ 371 (c)(1),
(2), (4) Date: Jul. 29, 2008

(87) PCT Pub. No.: WO2007/090700
PCT Pub. Date: Aug. 16, 2007

(65) Prior Publication Data
US 2009/0053543 A1 Feb. 26, 2009

(30) Foreign Application Priority Data
Feb. 8, 2006 (DE) .......................... 10 2006 005 807

(51) Int. Cl.
*B01D 46/00* (2006.01)
(52) U.S. Cl. ................. 55/486; 55/524; 55/525
(58) Field of Classification Search ......... 55/486, 55/492, 524, 525, 487, 488, 489, 485
See application file for complete search history.

(56) References Cited

U.S. PATENT DOCUMENTS

| | | | | |
|---|---|---|---|---|
| 2,082,513 A | | 6/1937 | Roberts | |
| 3,388,536 A | * | 6/1968 | Nash | 55/492 |
| 3,727,769 A | * | 4/1973 | Scholl | 210/484 |
| 3,763,633 A | | 10/1973 | Soltis | |
| 3,854,912 A | | 12/1974 | Terrel et al. | |
| 3,912,474 A | | 10/1975 | Drews | |
| 3,912,634 A | * | 10/1975 | Howell | 210/222 |
| 4,111,815 A | * | 9/1978 | Walker et al. | 210/487 |
| 4,126,560 A | * | 11/1978 | Marcus et al. | 210/489 |
| 4,266,528 A | | 5/1981 | Barnhart et al. | |
| 4,302,333 A | | 11/1981 | Cosack | |
| 4,348,362 A | * | 9/1982 | Foss | 422/171 |
| 4,631,077 A | * | 12/1986 | Spicer et al. | 55/487 |
| 4,904,288 A | * | 2/1990 | d'Augereau | 55/485 |

(Continued)

FOREIGN PATENT DOCUMENTS

CN 1082578 A 2/1994
(Continued)

OTHER PUBLICATIONS

International Search Report PCT/EP2007/050172.

*Primary Examiner* — Duane Smith
(74) *Attorney, Agent, or Firm* — James E. Howard; Andre Pallapies

(57) ABSTRACT

A filter element for an extractor hood comprising a filter body including at least one covering layer, at least one intermediate filter layer and a coating layer applied to at least a portion of the at least one covering layer, wherein the at least one intermediate layer is free from this coating.

18 Claims, 2 Drawing Sheets

U.S. PATENT DOCUMENTS

| | | | |
|---|---|---|---|
| 4,923,725 A | 5/1990 | Zafiroglu | |
| 5,399,265 A | 3/1995 | Nehls | |
| 5,423,903 A * | 6/1995 | Schmitz et al. | 96/134 |
| 5,716,558 A | 2/1998 | Nielsen et al. | |
| 5,791,984 A * | 8/1998 | Kane | 454/276 |
| 5,858,045 A * | 1/1999 | Stemmer et al. | 55/486 |
| 5,874,052 A | 2/1999 | Holland | |
| 6,056,809 A * | 5/2000 | Chapman | 96/67 |
| 6,156,089 A * | 12/2000 | Stemmer et al. | 55/467 |
| 6,322,615 B1 * | 11/2001 | Chapman | 96/67 |
| 2003/0079609 A1 * | 5/2003 | Lobiondo, Jr. | 96/59 |
| 2004/0081818 A1 * | 4/2004 | Baumann et al. | 428/323 |
| 2004/0083693 A1 | 5/2004 | Keller | |
| 2004/0083697 A1 | 5/2004 | Niakin | |
| 2010/0247404 A1 * | 9/2010 | Ptak et al. | 422/187 |

FOREIGN PATENT DOCUMENTS

| | | |
|---|---|---|
| DE | 1 00 161 | 9/1973 |
| DE | 91 10 837 U | 2/1992 |
| DE | 44 20 820 | 12/1995 |
| DE | 195 07 645 | 8/1996 |
| DE | 296 08 757 U | 9/1996 |
| DE | 101 06 306 | 7/2002 |
| DE | 20 2004 002 951 U | 9/2004 |
| EP | 0 831 277 | 3/1998 |
| EP | 1 231 437 | 8/2002 |
| GB | 2 349 837 | 11/2000 |
| JP | 5-293318 | 11/1993 |
| JP | 7-116436 | 5/1995 |
| WO | WO 96/02313 | 2/1996 |
| WO | WO 96/09118 | 3/1996 |
| WO | WO 2006/114342 | 11/2006 |

* cited by examiner

FILTER ELEMENT FOR EXTRACTOR HOOD

BACKGROUND OF THE INVENTION

The present invention relates to a filter element for an extractor hood.

Filter elements, especially filter cassettes, are used in extractor hoods to separate contaminants, especially grease particles, from the vapor which is sucked through the extractor hood. The filter cassettes are attached in a detachable manner to the extractor hood, so that they can be separated from the extractor hood to allow cleaning. To enable the removal of the contaminants deposited on the filter to be simplified, a filter element is proposed for example in JP 05293318A, in which a film coating, for example a silicon resin film, is applied to a filter laminate. The filter laminate in this case consists of a layer of unwoven metal fibers which is pressed between two expanded metal layers.

The disadvantage of this filter element lies in the fact that the filter characteristics of the filter element can be adversely affected in the coating of the laminate, since the coating is applied both to the expanded metal layers and also to the metal fiber layer lying between them.

The object of the invention is thus to create a filter element that is simple to clean and in which the filter characteristic can be explicitly set.

BRIEF SUMMARY OF THE INVENTION

In accordance with the invention this object is achieved by a filter element for an extractor hood comprising at least one covering layer and at least one intermediate layer. The filter element is characterized in that, on at least one part of at least one surface of at least the covering layers a coating is provided and the at least one intermediate layer is free from this coating.

Since only the covering layers are provided with the coating it becomes possible to explicitly set the filter characteristics, especially the passage of sucked-in air which affects the performance of the extractor hood. The characteristics of the intermediate layer are not changed in relation to an uncoated filter element and can be set in the known way, such as for example the appropriate selection of mesh sizes and the number of the intermediate layers. When the filter element is used the flow is initially towards the side of the filter element facing the point at which the vapor is produced and especially the covering layer provided there. Most deposits of contaminants will thus be reckoned to be deposited on this layer. Apart from the contaminants separated from the vapor, there is also contamination at this filter layer arriving from the environment at this covering layer, such as dust, which easily adheres to the greasy covering layer. By providing the coating on at least this covering layer on one hand the adherence of the contaminants can be reduced and on the other hand the cleaning of the filter element can be simplified. The possible length of time for which a filter element can be used between two cleaning steps is thus increased and the entire possible lifetime of the filter element is increased on account of the improved cleaning options.

Preferably the coating is applied to the at least one covering layer before the filter layers are assembled. This method of manufacturing is able to guarantee an exclusive coating of the covering layer in a simple manner. An accidental coating of an adjacent intermediate layer cannot occur in this case and the filter characteristics of the filter element are thus maintained in a simple manner. In addition the covering layer can also be reliably coated on all sides in this case. It is also possible to apply a coating only to the side of the covering layer through which the vapor flows in the installed state, with the edges of passages in the covering layer also being coated to prevent the adhesion of contaminants in the passages or openings respectively.

The filter layers of the filter element preferably take the form of expanded metal layers. Expanded metal is good for applying a coating since in this case, by comparison with fiber materials, the passages are clearly specified and their size can be set. Furthermore with expanded metal layers the covering layer can be clearly defined. Finally expanded metal layers are as a rule held together in filter elements by purely mechanical connection technology. Pressing or other processing of the expanded metal layers which may be accompanied by processing at increased temperatures does not occur in these cases. Thus the coating can be applied before the filter layers are put together and there is no danger of damaging the coating when assembling the filter element.

In accordance with a preferred embodiment the mesh width of the covering layers in the uncoated state is greater than the mesh width of the at least one intermediate layer. The size of the passages or the distance between webs in the respective layers is referred to as the mesh width. These are determined by the web width and the web spacing. A greater mesh width in the covering layers can take account of the greater layer thickness of the coating which leads to a reduction in the mesh width. Thus, in the filter element, after the coating of the covering layers, it can be assured that in all filter layers the same mesh size is present or that the mesh size in the covering layer continues to be larger than the mesh size in the intermediate layers. This dimensioning of the mesh size is of importance for flow technology reasons since with too small a mesh size in the covering layer onto which the vapor flows the result can be a buildup of vapor below the filter element.

The mesh size in the covering layer, for a mesh size in the intermediate layer of for example 4 mm, can lie in the range of 5 to 6 mm. The thickness of the coating can lie in the range of 5 μm to 1 mm. Preferably however a smaller layer thickness of the coating in the range of 8 to 30 mm is selected.

In accordance with one embodiment the filter element features a frame for supporting the edges of the filter layers and the frame is provided on at least its outer side with a coating. This enables the hygiene to be increased when the filter element is used. Although the frame as such does not contribute to the actual filter process it is subjected to the incoming flow of vapor. In addition, as already mentioned, the use of a frame allows a number of filter layers to be combined without having to use a thermal process or a press process for joining the filter layers. Thus at least one of the covering layers can be provided with the coating before the assembly of the filter element and there is no danger of the coating being damaged.

The coating is preferably an alkali-resistant coating. By using an alkali-resistant coating, as well as the simplification of the removal of contaminant deposits, protection against the surface of the covering layer being attacked by alkalis is also provided. The filter element is subjected to such an attack especially when being cleaned in a dishwashing machine. Without the coating the filter material, which is aluminum for example, would be attacked by the lyes in the dishwashing machine and this would cause the optical appearance of the filter element to deteriorate, at least after being cleaned a number of times.

It is inventively possible to only coat one of the covering layers in the filter element. In such cases the filter element is used in an extractor hood such that the coated covering layer is facing the flow of vapor. Since however when the filter element is removed and it is cleaned the side facing away from the vapor is also subjected to media such as washing-up media for example, both covering layers are preferably coated.

Since just the covering layers and not also the intermediate layers of the filter element are coated the manufacturing costs of the filter element are reduced.

In accordance with one embodiment the coating can be a powder coating. Powder coatings can be applied to filter layers in which openings are left for the passage of vapor during cleaning without any fear of a blockage or closing-off of the openings. The coating applied in powder form can be fixed by heat treatment for example. Unlike in a dip coating process, in which the openings may be closed off by the coating material, in a powder coating the maintenance of the through-openings, and by an explicit setting of the layer thickness, the setting of a predetermined size of the passage-openings can be guaranteed. A coating applied by powder coating, for example a lacquer, is characterized by its good adhesion to the surface of the covering layer.

The coating material is preferably a lacquer. By using a lacquer, and especially a hard lacquer, the coating is also able to withstand mechanical attacks and in particular is scratch-resistant. These mechanical attacks can for example occur during the manual cleaning of the filter element.

In accordance with one embodiment the coating material is a clear epoxy polyester lacquer. This lacquer combines the properties needed for the inventively achieved purpose. In particular the alkali resistance of the covering is guaranteed and the optical appearance is not affected because of the transparency of the lacquer. In addition the coating achieves a chemically-resistant sealing of the material of the covering layer against oxidization processes, which for example occur through the attack of strong alkalis such as in the dishwashing machine for example. The lacquer also has a low surface polarity and thus has a very low tendency to contamination. Finally the mechanical and chemical strength values of this lacquer are also sufficient to make the surface of the covering layer resistant to alkalis in the dishwashing machine.

BRIEF DESCRIPTION OF THE DRAWINGS

The invention will be described again below on the basis of the enclosed drawings. The figures show.

DETAILED DESCRIPTION OF THE PRESENT INVENTION

Figure 1:
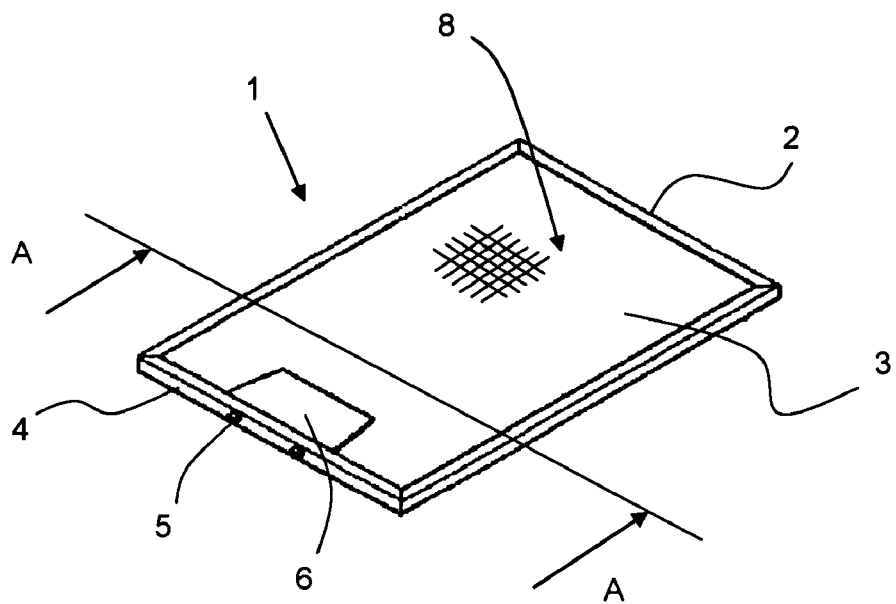
FIG. 1: a schematic, perspective overhead view of a filter element.
Figure 2:
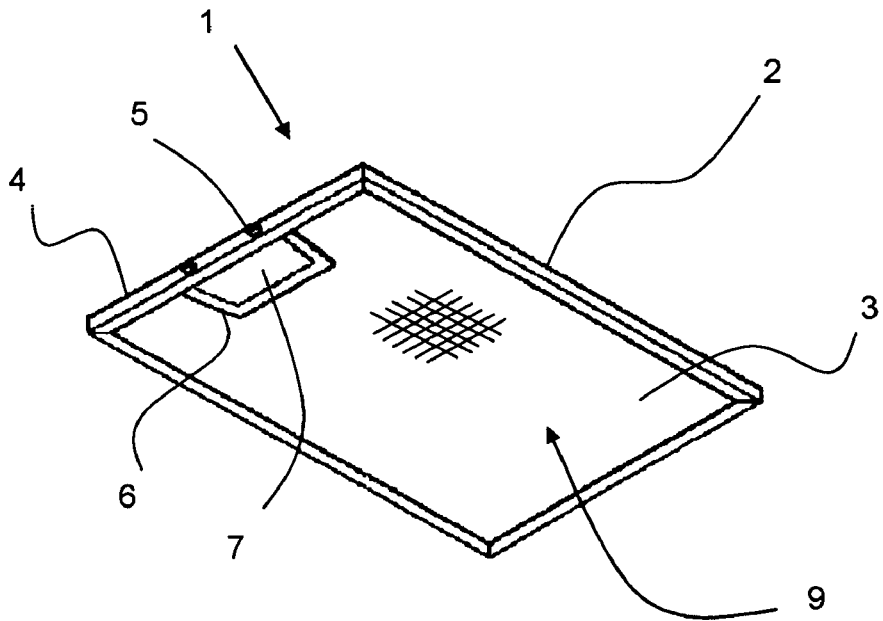
FIG. 2: a schematic, perspective view from below of a filter element.

In the embodiment shown in FIG. 1 the filter element 1 is a filter cassette. This filter cassette 1 comprises a frame 2 and filter layers 3 held within it. The filter cassette 1 can be used in an extractor hood (not shown) in the area of the suction surface and can function as a grease filter there. To attach the filter cassette 1 to the extractor hood, in the embodiment shown, latching elements 5 are provided on the front side 4 of the filter cassette 1. The latching elements 5 can be actuated via an actuation mechanism which is provided in a housing 6 provided for them in the area of the filter layers 3. As can be seen from FIG. 2, a handle is provided on the underside of the housing 6 via which the actuation mechanism can be operated. There are cutouts in the filter layers in the area of the housing 6.

Figure 3:
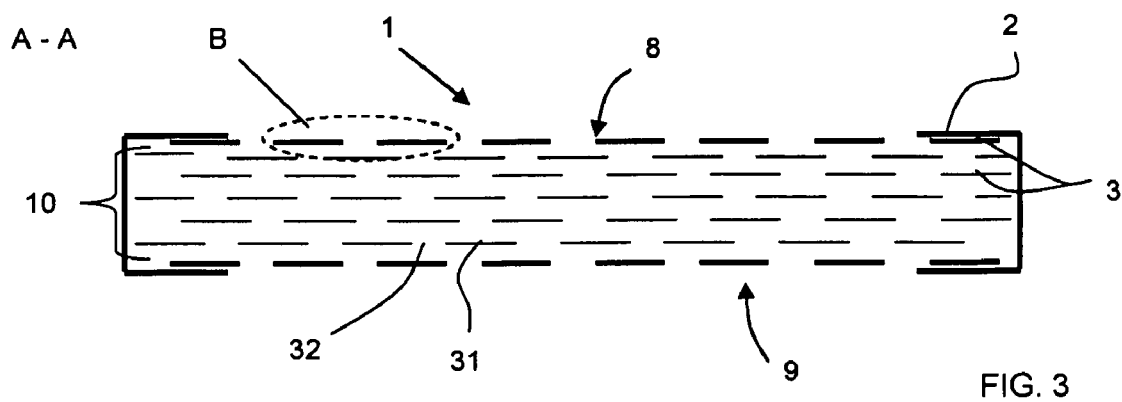
FIG. 3: a schematic cross sectional view of the filter element depicted in FIG. 1.

The filter layers 3 are present in the remaining area of the frame 2. The arrangement of the filter layers 3 is depicted schematically in the cross-sectional diagram shown in FIG. 3. The filter layers 3 extend in the surface defined by the frame 2 and are laid on top of each other. In this case the upper filter layer and the lower filter layer form covering layers 8, 9.

The individual filter layers 3 are made of expanded metal. The filter layers 3 thus possess webs 31 and openings 32 formed between the webs which are also referred to as meshes.

In the covering layers 8, 9 and the intermediate layers 10 in the embodiment shown the mesh widths, meaning the width of the openings 32, are the same size. However the covering layers 8 and 9 have the structure shown in FIG. 4. The material of filter layers 3 or of the expanded metal respectively is especially aluminum. This is covered on the covering layers 8 and 9 by a coating 11 of a clear lacquer with a lotus flower effect. The original mesh width 32' of the covering layers 8, 9 is thus greater than the mesh width 32 necessary for use. The coating 11 is applied to the expanded metal of the covering layers 8, 9 through a powder coating method.

In this way an even coating of the webs 31 can be guaranteed and simultaneously a closing of the openings or meshes 32 respectively can be prevented.

The covering layers 8, 9 coated in this way can now be held in a frame 2 with uncoated intermediate layers. Preferably the frame 2 is also covered with the coating 11 before being assembled with the filter cassette 1. In this way a filter cassette 1 is created in which all the sides facing outwards are coated. Since the covering layers 8, 9 are coated before assembly, the intermediate layers 10 are free of the coating 11 and the suction power of the extractor hood which can be achieved with the filter element 1 is not adversely affected. In addition the manufacturing costs for the filter cassette 1 are lower than for coating all filter layers 3 by virtue of only coating the covering layers 8 and 9 and the frame 2.

Figure 4:
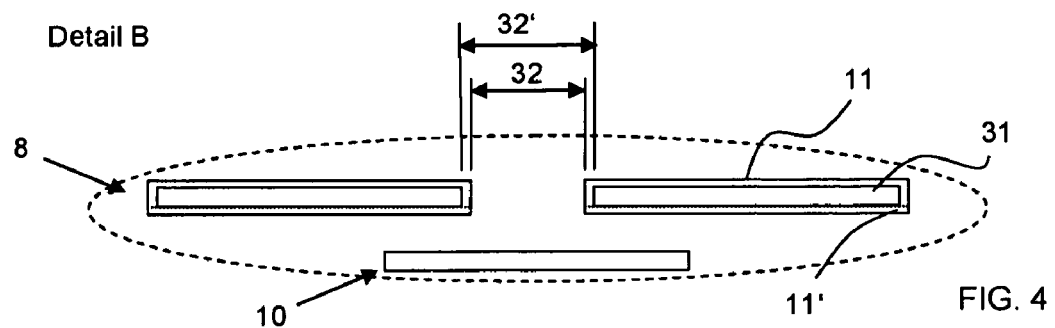
FIG. 4: a detailed view of the filter layers.

The coating 11 can, as shown in FIG. 4, completely surround the webs 31 of the covering layers 8. All sides of the covering layer 8 are coated here. However it is also possible for the covering layer 8 to be exclusively coated on one side and at the edges of the openings 32. In this case the part 11' of the coating 11 shown below the dashed line in FIG. 4 would be omitted. In this embodiment the covering layer 8 is integrated into the filter cassette 1 such that the uncoated side is facing towards the intermediate layers 10.

The lacquer applied as coating 11 on the at least one covering layer 8 can for example be a two-component lacquer, which is hardened by a chemical reaction. In particular the lacquer involved has a reduced surface polarity. An epoxy polyester lacquer has proved especially suitable. If this is used as a clear lacquer the usual visual appearance of the filter element 1 can be maintained. In particular an optical prominence of the filter cassette 1 in relation to the extractor hood screen, which for food is made of stainless steel for example, can be avoided. The filter element fits into the overall optical impression far better.

Thus with the present invention a filter element for an extractor hood can be created in which the covering layers are resistant to chemicals and alkalis because of the coating. When the filter element is used in an extractor hood, because of the coating, especially with a coating with reduced surface polarity, the result can be a lotus flower effect, whereby a contamination of the filter element can be minimized. Furthermore, as a result of the durability of the coating the cleaning of the filter element can be simplified. In addition an anti-oxidization effect is evident from the sealing of the surface of the covering layer by the coating, through which an oxidization of the material of the covering layer is avoided. Because of the coating a spotting, which occurs with uncoated metal filters after multiple cleaning in which the filter element is subjected to chemicals, can be prevented. In addition the coating can impart a scratch resistance to the covering layers which guarantees a long life of the coating and thus protection for the covering layers.

The invention claimed is:

1. A filter element for an extractor hood comprising a filter body including at least one covering layer, at least one intermediate filter layer and a coating layer applied to at least a portion of the at least one covering layer, wherein the at least one intermediate layer is free from this coating, and wherein the at least one intermediate filter layer includes at least one expanded metal layer.

2. The filter element according to claim 1 wherein the at least one covering layer and the at least one intermediate filter layer comprise a mesh with openings, and wherein a width of the openings in the mesh of the at least one covering layer in the uncoated state is greater than a width of the openings in the mesh of the at least one intermediate filter layer.

3. The filter element according to claim 1 wherein the filter element features a frame for holding the edges of the at least one covering layer and the frame is provided at least on an outer side thereof with a coating layer.

4. The filter element according to claim 1 wherein the coating layer is formed from an alkali-resistant material.

5. The filter element according to claim 1 wherein the coating layer is a powder coating.

6. The filter element according to claim 1 wherein the coating material includes a lacquer.

7. The filter element according to claim 6 wherein the coating material includes an epoxy polyester lacquer.

8. The filter element according to claim 1, wherein the coating layer is bonded to the material of the covering layer.

9. The filter element according to claim 1, wherein the at least one covering layer comprises:
   a first covering layer located on a first side of the at least one intermediate filter layer; and
   a second covering layer located on a second side of the at least one intermediate filter layer.

10. The filter element according to claim 9, wherein the coating layer is not formed on sides of the first and second covering layers that face the at least one intermediate filter layer.

11. The filter element according to claim 1, wherein the at least one covering layer and the at least one intermediate filter layer each comprise flat sheets of material having a plurality of substantially uniform apertures therethrough.

12. The filter element according to claim 11, wherein a width of the apertures in the at least one covering layer before the coating layer is applied is greater than a width of the apertures in the at least one intermediate filter layer.

13. The filter element according to claim 12, wherein after the coating layer is applied to the at least one covering layer, a width of the apertures in the at least one covering layer is substantially equal to a width of the apertures in the at least one intermediate filter layer.

14. A filter element for an extractor hood, the filter element comprising:
   at least one intermediate filter layer;
   a first covering layer located on a first side of the at least one intermediate filter layer;
   a second covering layer located on a second side of the at least one intermediate filter layer; and
   a coating layer applied to portions of the first and second covering layers, wherein the at least one intermediate filter layer is free from this coating, and wherein the coating layer is not formed on sides of the first and second covering layers that face the at least one intermediate filter layer.

15. The filter element according to claim 14, wherein the first and second covering layers and the at least one intermediate filter layer each comprise flat sheets of material having a plurality of substantially uniform apertures therethrough.

16. The filter element according to claim 15, wherein a width of the apertures in the first and second covering layers before the coating layer is applied is greater than a width of the apertures in the at least one intermediate filter layer.

17. The filter element according to claim 16, wherein after the coating layer is applied to the first and second covering layers, a width of the apertures in the at least one covering layer is substantially equal to a width of the apertures in the at least one intermediate filter layer.

18. The filter element according to claim 14, wherein the at least one intermediate filter layer includes at least one expanded metal layer.

* * * * *